Feb. 7, 1933.  G. JOHNSON  1,896,867
SLIDE FASTENER
Filed May 26, 1931
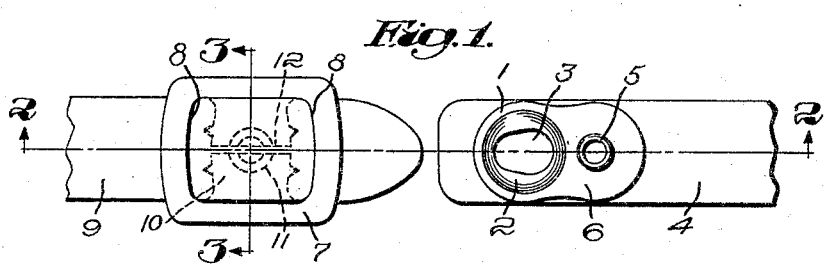
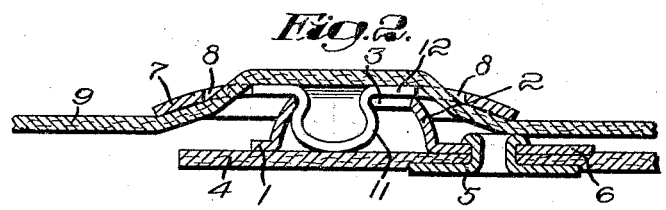
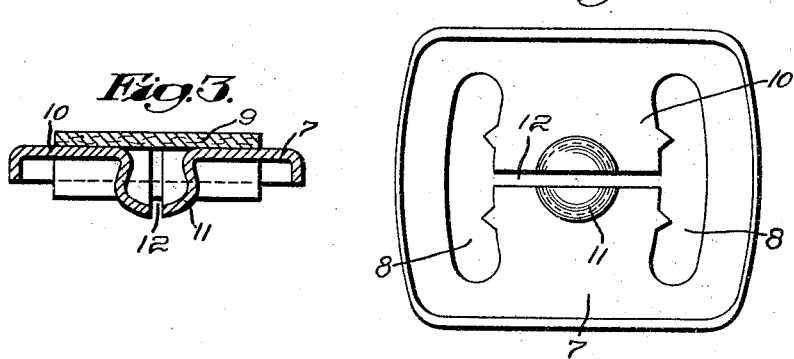
Inventor:
Gustav Johnson
by Emery, Booth, Varney & Townsend
Attys Patented Feb. 7, 1933

1,896,867

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SLIDE FASTENER

Application filed May 26, 1931. Serial No. 540,026.

My invention aims to provide improvements in slide fasteners for attachment to shoes, gloves and the like.

In the drawing which illustrates a preferred embodiment of my invention:—

Figure 1 shows a plan view of a slide fastener stud and a cooperating socket prior to engagement;

Fig. 2 is an enlarged section taken on the line 2—2 of Figure 1, but showing the fastener members in cooperative engagement;

Fig. 3 is a section taken on the line 3—3 of Figure 1 showing the construction of the slide fastener stud; and Fig. 4 is an enlarged under side plan view of the slide fastener stud prior to attachment to a strap or the like.

In the embodiment of my invention illustrated, I have shown a simple slide fastener particularly, though not exclusively, adapted for use in connection with straps on gloves, overshoes and the like. It is the usual practice to provide a slide fastener member in the form of a socket while the fixed member is provided as a stud so that the head of the stud will project outwardly in order that the installation may lie smoothly next to the wearer of the garment. In my particular installation I have so designed and arranged the parts that the stud member may be provided as a slide and the socket may be provided as the fixed fastener element, as shown in Figs. 1 and 2.

The socket member is formed from a single piece of sheet metal and includes a plate portion 1 having a hollow boss 2 pressed therefrom and provided in its outer end with an elongated stud-receiving aperture 3 which is slightly reduced at one end, as clearly shown in Figure 1. My improved socket member may be attached to its carrying medium 4 in any suitable manner, but in the drawing I have shown it as being attached by means of a rivet 5 located at the under side of the carrying medium 4 and extending through the carrying medium and through a lateral extension 6 of the plate 1.

My improved slide fastener stud member is formed from a single piece of metal and comprises a plate 7 having oppositely disposed strap-receiving slots 8—8 through which is threaded a strap 9 (Figs. 1 and 2). The plate portion 10 which lies between the slots 8—8 has a socket-engaging stud portion 11 pressed therefrom and the plate portion 10 and stud portion 11 are divided by a slit 12 extending through those portions from one slot 8 to the other slot 8, as best illustrated in Fig. 4. The slot 12 divides the plate portion 10 into two parts, thereby permitting yielding thereof so that the stud member may contract and expand during engagement with and disengagement from the socket member.

In the normal operation of my improved fastener device the stud member 11 is pressed into engagement with the boss 2 of the socket member through the enlarged portion of the aperture 3 and the normal lateral stress will pull the stud into the reduced portion of the aperture 3, thereby locking the stud and socket against accidental separation. While the fastener members when engaged, as shown in Fig. 2, cannot be separated by any normal lateral stresses exerted thereon, nevertheless there is sufficient contraction to the stud portion 11 to permit it to be separated from the boss 2 of the socket when the end of the strap 9 is lifted upwardly and away from the socket member. It will be noted from an inspection of Fig. 2 that the boss portion 2 of the socket is of sufficient length to accommodate the head of the stud in such a manner that it will not bulge the socket-carrying medium 4 beneath the socket. Therefore, my improved installation is simple, durable and particularly comfortable to the person wearing the glove, overshoe, or the like which includes such an installation.

While I have illustrated and described a preferred embodiment of my invention, I do not wish to be limited thereby, because the scope of my invention is best defined by the following claims.

I claim:—

1. A snap fastener installation comprising, in combination, a stud member having contractible and expansible socket-engaging means, a socket member having a hollow boss to receive and house the socket-engaging means and provided with an elongated aperture reduced slightly at one end and a socket-carrying medium to which said socket member is attached, said stud member being adapted to enter said boss by a snap action through the largest part of said aperture and being normally pulled by lateral stress into the reduced end of said aperture to prevent accidental separation of the fastener member when in use and attaching means formed integral with one of said fastener members and formed for sliding attachment thereof to a strap.

2. A slide fastener installation comprising, in combination, a stud member including a plate portion having strap-receiving slots therein, a contractible and expansible stud portion extending from said plate portion between the said slots, a strap passing through said slots and comprising a stud-carrying medium, a socket secured to a socket-carrying medium and having a hollow boss provided with an elongated aperture reduced slightly at one end and means located laterally at one side of said boss and formed for attaching said socket member to the socket-carrying medium and said socket-carrying medium underlying said boss and providing a cushion therefor, said stud being adapted to enter said boss through the aperture therein and being normally pulled by lateral stress into the reduced end of said aperture to prevent accidental separation of the fastener members when in use.

In testimony whereof, I have signed my name to this specification.

GUSTAV JOHNSON.